April 16, 1940.  E. W. MENKE  2,197,274

METHOD OF METAL COATING

Filed Oct. 16, 1935

INVENTOR.
Edward W. Menke
BY
ATTORNEY.

Patented Apr. 16, 1940

2,197,274

UNITED STATES PATENT OFFICE 2,197,274

METHOD OF METAL COATING

Edward W. Menke, Chicago, Ill., assignor, by direct and mesne assignments, to Kelmenite Corporation, a corporation of Illinois Application October 16, 1935, Serial No. 45,194

11 Claims. (Cl. 91—70.2)

The present invention relates to metal coatings and particularly to a process of applying metal to glass to form a reflector. More specifically the present invention comprises a new and novel process in which molten aluminum is sprayed upon a body of glass to form a bright reflecting surface thereon which is bonded to the glass base.

It is an object of the present invention to provide a new and novel reflector-forming process in which aluminum and certain of its alloys may be sprayed upon glass to form a permanent union. A further object is to provide a new and novel method of spraying an aluminum coating upon glass to form a permanent reflecting surface of maximum brightness. Still another object is to provide a reflector-forming process in which molten aluminum or its alloy is sprayed upon a glass base, the heat relationships between the metal and the base being such that a permanent weld is provided. A still further object is to provide a reflector by spraying molten aluminum upon glass. These and other more specific objects will become apparent upon reading the following specification and upon considering in connection therewith the drawing attached.

Referring now to the drawing.

Figure 1:
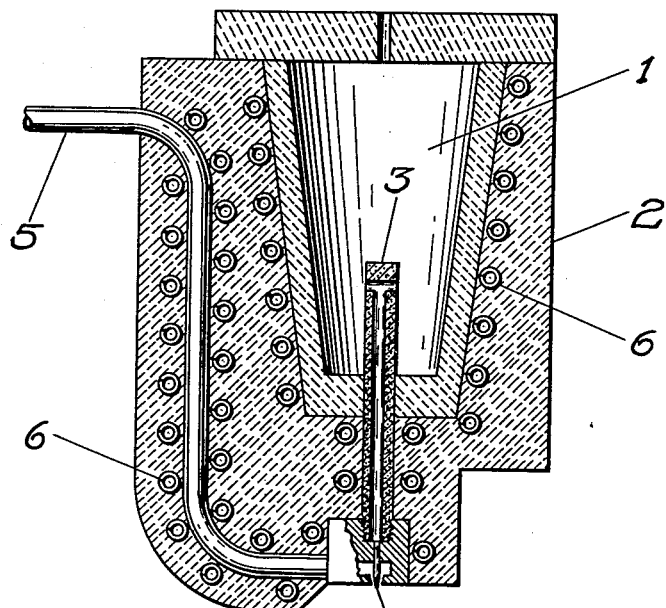
Figure 1 is a showing, partly in section, of the apparatus by which the present invention can be effected.

Heretofore metal has been sprayed in a molten state upon various bases. Before the present invention, however, it has never been possible to form a satisfactory reflecting surface by spraying aluminum and certain of its alloys on a glass base to form a permanent union. The prior art has taught, as for example in the patent to Schoop 1,128,058, that metallic coatings on polished or cut glass "will adhere to these only by the action of atmospheric pressure." With the metallic coating applied according to the present invention the coating can not be separated from the base as an entity. The forcible separation of the two results in a tearing away of part of the glass base with the coating showing that a union similar to a weld and possibly involving a molecular interlocking has been effected.

According to the present invention, the sprayed metal comprises aluminum or an alloy thereof including minor parts of silicon, or antimony, or magnesium, or cadmium, or even tin, although the last is not as desirable as certain of the other alloying elements. The metal to be sprayed is heated in a crucible 1 in the sprayer formed of an enclosing body 2 of refractory material. A conduit 3 of suitable material insoluble in melted aluminum extends from the crucible 1 and opens into a nozzle 4 which is surrounded at its end by the outlet of gas conduit 5. Both conduits and the crucible are heated by encircling electric coils 6 to a temperature above the melting point of aluminum. Gas conduit 5 is connected to a supply of non-oxidizing gas, such as illuminating gas.

Nozzle 4 is extremely small in the aperture thru which the liquid metal is drawn by the exhausting gas in a common and well known manner. The molten metal is carried by the non-oxidizing gas in an extremely fine spray from the nozzle. At the time of leaving nozzle 4 both metal and carrying gas are at a temperature above the melting point of the molten metal, preferably between the melting temperature and 1600 degrees F.

Opposite nozzle 4 is a furnace 8 provided with heating coils 9 and supporting a body or base of glass 10, the surface of which is smooth and may be polished. The distance separating nozzle 4 from base 10 is preferably from 4 to 6 inches.

Furnace 8 raises the temperature of the base 10 to a temperature of several hundred degrees Fahrenheit, preferably around 700 degrees F.

In the carrying out of the process the temperature of the glass base is raised to the desired point, the nozzle 4 is moved slowly relative thereto, liquid aluminum being carried in a finely divided spray to the base in a surrounding atmosphere of heated non-oxidizing gas, and deposited thereon. The deposition of the coating of aluminum, which is still at a temperature substantially above the melting point of aluminum, causes a microscopic layer or thickness of the glass to be raised to a temperature at or above the melting point of aluminum. The exact interaction which occurs between the metal and the glass is not definitely understood but it is believed that at the critical temperature stated a molecular interlocking between the metal and the glass takes place. At least it is known that for the first time the metallic aluminum or aluminum alloy which has been sprayed on the glass and which forms a reflecting surface at the common surface cannot be separated therefrom at the original surface plane of the glass.

Figure 2:
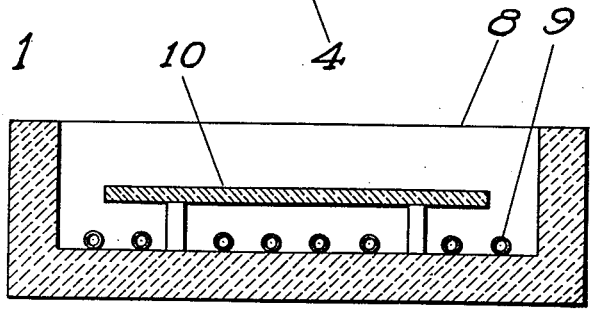
Figure 2 is a cross section thru a mirror which has been made by the present invention.
Figure 2:
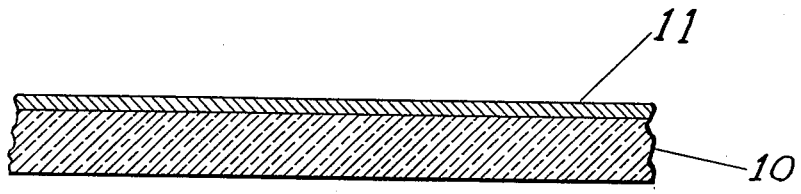

It is to be understood that the exact temperature to which the glass base is heated is not critical. What is critical is that the glass base be heated to a temperature such that the deposited highly heated metallic coating is able to raise a microscopic layer of the glass body to a temperature at or above the melting point of aluminum. When this relationship is attained an aluminum coating 11 is welded to the glass base, as illustrated in Figure 2, to form a perfect reflecting surface.

I claim:

1. The process of producing a permanent coherent coating of aluminum on a glass base to form a reflector at the common surface, which consists in heating the glass and then projecting finely divided molten aluminum onto the surface of the glass which is at a temperature below the melting point of aluminum, the temperature of the deposited aluminum being sufficiently high to raise the temperature of a surface layer only of the glass at least to the melting point of aluminum.

2. The process of producing a reflector comprising a permanent coherent coating of a metallic alloy of which aluminum is the principal and character-determining ingredient on a glass base, which consists in heating the glass and then projecting the finely divided molten alloy onto the surface of the glass which is at a temperature below the melting point of the alloy and forming a thin coating thereon, the temperature of the alloy being sufficiently high to raise the temperature of the surface of the glass at least to the melting point of the alloy.

3. The process of producing a permanent reflector comprising a coherent metallic coating, of which aluminum is the principal ingredient on glass, which consists in heating a glass base and then projecting the molten metal in a finely divided state in an atmosphere of a non-oxidizing gas onto the surface of the glass, the temperature of the body of the glass being below the melting point of the metal, the temperature of the deposited metal and of the gas being sufficiently above the melting point of the metal to raise the temperature of the surface of the glass to at least the melting point of the metal.

4. The process of producing a permanent metallic reflecting coating of aluminum on glass and at the common surface, which consists of spraying molten aluminum in a finely divided state and at a temperature above its melting point onto a heated body of glass which is at a lower temperature, the relative temperatures of the deposited aluminum and of the glass being such that the glass surface at the point of deposition of the aluminum is raised to the melting point of aluminum.

5. The process of producing a permanent reflecting surface of aluminum on a glass base, which consists in projecting finely divided aluminum from a body of aluminum at a temperature between the melting temperature of aluminum and 1600 degrees F. onto a glass base heated to a point below the melting temperature of aluminum but sufficiently high to permit the surface contacted by the aluminum to be raised by the contact therewith to at least the melting point of aluminum.

6. The process of producing a permanent metallic reflecting coating of aluminum on glass, comprising heating a body of aluminum to a temperature between 1218 and 1600 degrees F., heating a gas to substantially the same temperature, and spraying the aluminum in an atmosphere of the gas to form a coating on a glass base which is sufficiently heated that a thin surface layer contacted by the coating is raised to at least 1218 degrees F. while the remainder of the glass remains at a lower temperature.

7. The process of producing a permanent metallic reflecting coating of aluminum on glass and at the common surface; comprising heating a glass body above room temperature to a temperature below the melting point of aluminum, heating a body of aluminum to a temperature above the melting point of aluminum, heating a non-oxidizing gas to substantially the temperature of the aluminum, spraying the aluminum in molten form onto the surface of the glass body in an atmosphere of the gas to form a thin coating, and raising the temperature of a thin layer of the glass adjacent said coating to the melting point of aluminum by heat from said coating.

8. The process of producing a permanent metallic reflecting coating of a metal, of which the major, principal and predominating ingredient is aluminum, on glass and at the common surface; comprising heating a glass base to approximately 700 degrees F., heating the metal to a temperature above its melting point to a molten condition, and spraying the molten metal on the glass to form a coating thereon, and raising a microscopic layer of the glass adjacent the coating to at least the melting point of the metal by transferring heat thereto from the coating.

9. The process of producing a reflector comprising a permanent coherent coating of aluminum alloy on a glass base; which consists in heating the glass to a temperature below the melting point of the alloy, and heating the aluminum alloy and projecting it in a finely divided molten condition, and at a temperature sufficiently high to raise the temperature of the surface of the glass to at least the melting point of the alloy, onto the glass to form a thin coating.

10. The process of producing a permanent metallic reflecting coating on glass at the common surface, the metal comprising aluminum alloyed with minor parts of a metal taken from the class consisting of silicon, antimony, magnesium, cadmium and tin, which consists in the steps of heating a glass base to approximately 700 degrees F., heating the metal to a temperature above the melting point to a molten condition, and spraying the molten metal on the glass to form a coating thereon, and raising a microscopic layer of the glass adjacent the coating to at least the melting point of the metal by transferring heat thereto from the coating.

11. The process of producing a permanent reflecting surface at the common surface of a glass base and a metallic coating, consisting of heating to above its melting point a body of metal of which the major, principal and predominating ingredient is aluminum, transmitting in a carrying gas heated to a temperature above the melting point of aluminum onto a glass base heated to a temperature of approximately 700 degrees F. the metal in a finely divided condition thru the atmosphere to form a coating at a temperature above the melting point of aluminum.

EDWARD W. MENKE.